C. A. SHOEMAKER.
TANK CAR.
APPLICATION FILED NOV. 1, 1917.
1,252,959.
Patented Jan. 8, 1918.
2 SHEETS—SHEET 1.
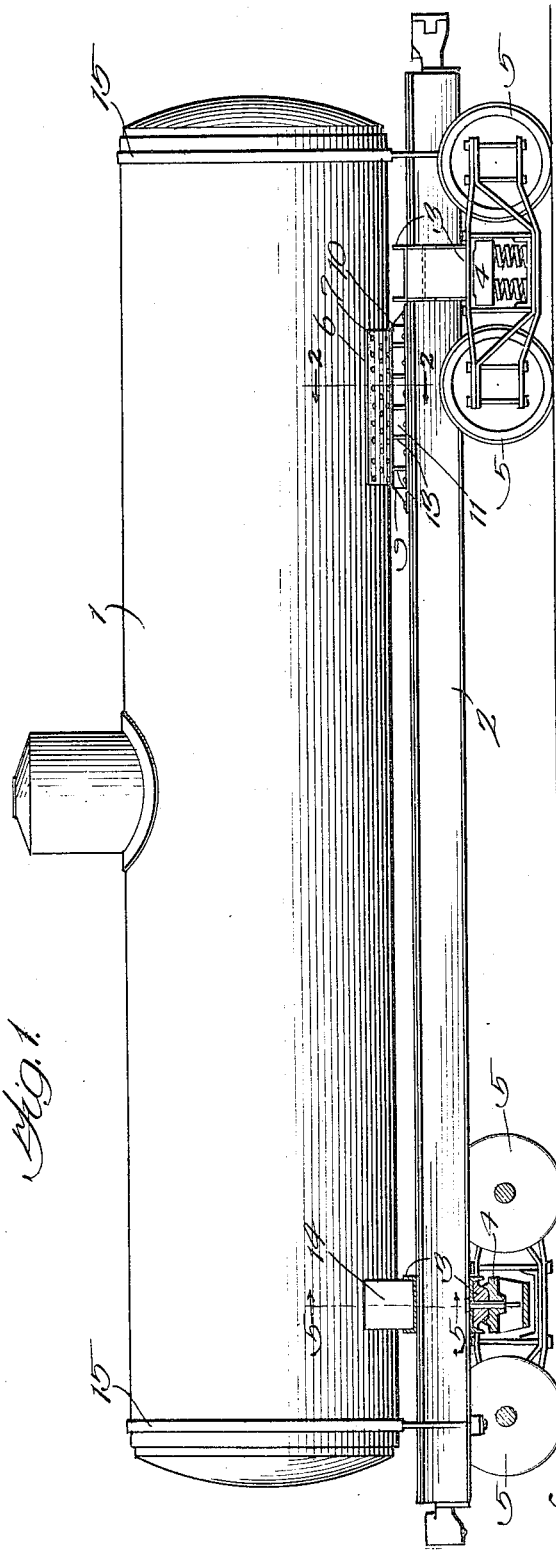
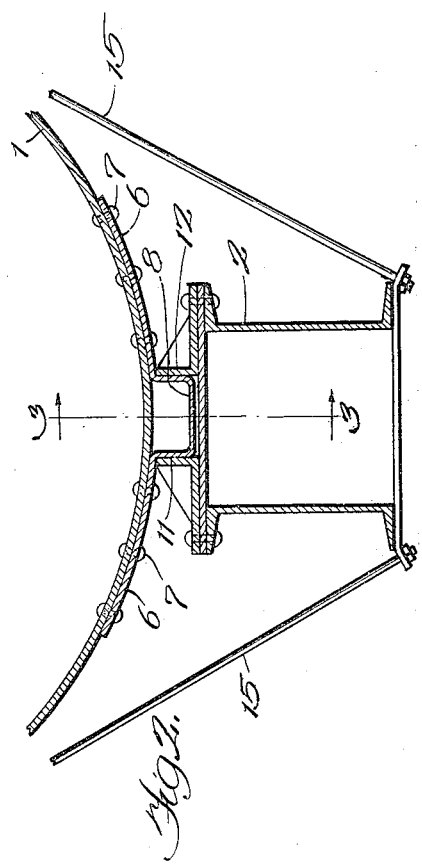
Inventor:
Charles A. Shoemaker.
By G. L. Grogg, Atty.

C. A. SHOEMAKER.
TANK CAR.
APPLICATION FILED NOV. 1, 1917.
1,252,959.
Patented Jan. 8, 1918.
2 SHEETS—SHEET 2.
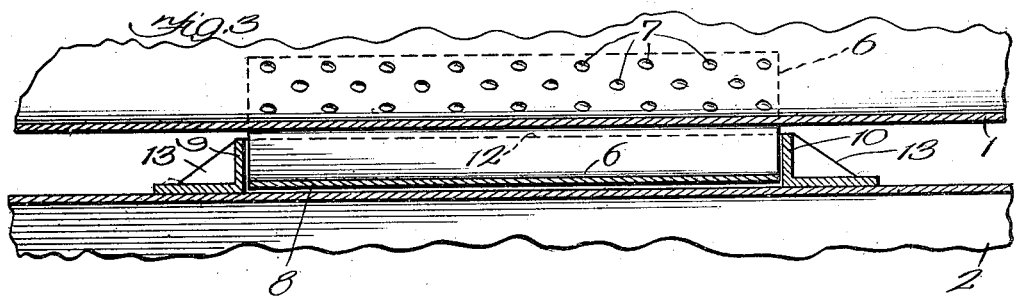
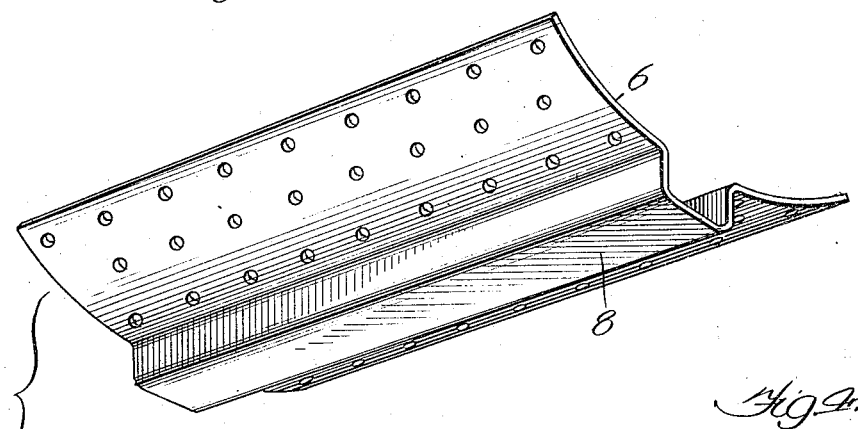
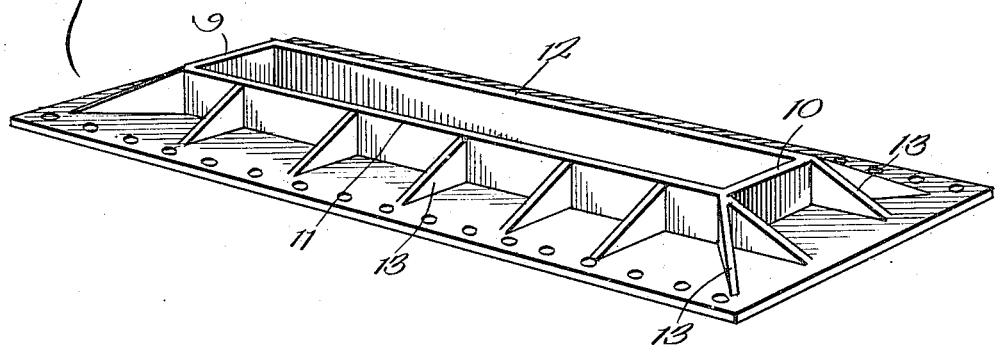
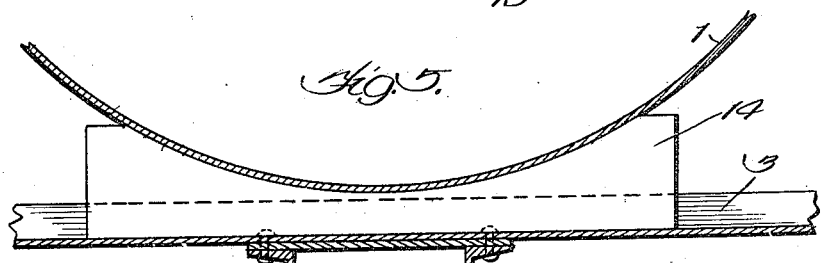
Inventor:
Charles A. Shoemaker.

UNITED STATES PATENT OFFICE.

CHARLES A. SHOEMAKER, OF CHICAGO, ILLINOIS.

TANK-CAR.

1,252,959.　　　　Specification of Letters Patent.　　Patented Jan. 8, 1918.

Application filed November 1, 1917. Serial No. 199,630.

*To all whom it may concern:*

Be it known that I, CHARLES A. SHOEMAKER, a citizen of the United States, residing at Chicago, in the county of Cook and State of Illinois, have invented a certain new and useful Improvement in Tank-Cars, of which the following is a full, clear, concise, and exact description.

My invention relates to tank cars and has for its general object the provision of improved means for assembling the tank and car underframe. In the preferred embodiment of the invention the tank is held, at one place, in desired relation to the underframe in a manner to allow contraction and expansion of the tank elsewhere without consequent buckling of any of the structural parts.

As I preferably practice my invention the tank is assembled with the underframe at one end of the car structure there to have minimum or no sliding movement with respect to the underframe, there being means elsewhere, as at the other end of the car structure, for permitting the tank to slide with respect to the underframe to allow the tank to expand and contract. By means of my invention there need be no objectionable rivets or bolts for directly uniting the tank structure with the underframe.

I will explain my invention more fully by reference to the accompanying drawings showing the preferred embodiment thereof and in which Figure 1 is a side elevation, partially in longitudinal section, of a tank car structure made in accordance with the invention; Fig. 2 is a view on line 2—2 of Fig. 1; Fig. 3 is a view on line 3—3 of Fig. 2; Fig. 4 is a perspective view of two members employed for assembling the tank and underframe; and Fig. 5 is a view on line 5—5 of Fig. 1.

Like parts are indicated by similar characters of reference throughout the different figures.

Two main parts of the car structure are the tank 1 and the underframe which is inclusive of the center sills 2 which are supported by body bolsters 3 that in turn are mounted to swing upon truck bolsters 4 that are mounted upon car wheels 5 belonging to wheel trucks at the forward and rear ends of the underframe, the type of underframe illustrated being well known to those skilled in the art but to the employment of which underframe I do not wish to be limited in practising my invention. The bottom of the tank is provided with a segmental plate 6 conforming in curvature thereto, this plate being fastened to the tank by means of rivets 7. The plate 6 is formed with a longitudinally extending depression 8 to constitute a depending rib or projection that overlies the space between the center sills 2 of the underframe. Two abutments 9 and 10, spaced apart longitudinally of the underframe, extend across the center sills and are riveted to the top flanges thereof. The space between these abutments corresponds very closely to the length of the rib 8 that is received between the abutments, there being desirably just sufficient clearance to enable the rib readily to be inserted between the abutments. For the sake of convenience in construction and assembly the abutments 9 and 10 are formed in the same casting with side abutments 11 and 12 that are also riveted to the center sills, the space between these side abutments corresponding to the width of the rib or projection 8 to have close engagement therewith to prevent material lateral movement of the rib and the lower portion of the tank with respect to the center sills. The parts of the abutments 9, 10, 11 and 12 that are engaged by the rib 8 desirably project upwardly from the center sills to a height at which the tank is to be supported above the underframe, the abutments 11 and 12 not only serving to prevent material longitudinal and transverse movements of the tank, but also acting as a seat structure upon which the tank plate 6 rests. The parts of the abutments that are riveted to the center sills are in a horizontal plane and are united with the tanks supporting vertical seat portions of the abutments by means of strengthening webs 13. The abutment structure 9, 10, 11 and 12 is preferably secured to the center sills adjacent the body bolster at one end of the car structure. A saddle 14, of any suitable formation, is desirably secured adjacent the body bolster at the other end of the car structure.

Material movement of the tank at the abutments 9 and 10 is prevented by the engagement of the rib 8 with said abutments but the part of the tank that is in engagement with the saddle 14 is permitted to move longitudinally of the underframe to allow of expansion and contraction of the tank. Tank bands 15, suitably secured at their ends to the center sills, serve to hold the tank down in firm seating engagement with the abutments 11 and 12 and the saddle 14.

In the construction described there are no rivets that rigidly unite the tank with the center sills, the assembly of the tank with the center sills at all places being sufficiently flexible to prevent wrenching, distortion and buckling of the tank structure.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A tank car structure including wheel trucks at its ends; an underframe carrying abutments spaced apart longitudinally thereof and secured thereto; a projection depending from the tank and interposed between said abutments both of which it closely approaches to prevent material movement of the tank longitudinally of the underframe at said depending projection; tank bands secured at their ends to the underframe and serving to hold the tank down to maintain said depending projection between said abutments; and side abutments with which the depending projection is also closely engaged to prevent material movement of the depending projection and the lower portion of the tank transversely of the underframe, some of said abutments projecting upwardly from the underframe to constitute a seat structure for holding the tank above the underframe.

2. A tank car structure including wheel trucks at its ends; an underframe carrying abutments spaced apart longitudinally thereof and secured thereto; a projection depending from the tank and interposed between said abutments both of which it closely approaches to prevent material movement of the tank longitudinally of the underframe at said depending projection; means for holding the tank down to maintain said depending projection between said abutments; and side abutments with which the depending projection is also closely engaged to prevent material movement of the depending projection and the lower portion of the tank transversely of the underframe, some of said abutments projecting upwardly from the underframe to constitute a seat structure for holding the tank above the underframe.

3. A tank car structure including wheel trucks at its ends; an underframe carrying abutments spaced apart longitudinally thereof and secured thereto; a projection depending from the tank and interposed between said abutments both of which it closely approaches to prevent material movement of the tank longitudinally of the underframe at said depending projection; tank bands secured at their ends to the underframe and serving to hold the tank down to maintain said depending projection between said abutments; and side abutments with which the depending projection is also closely engaged to prevent material movement of the depending projection and the lower portion of the tank transversely of the underframe.

4. A tank car structure including wheel trucks at its ends; an underframe carrying abutments spaced apart longitudinally thereof and secured thereto; a projection depending from the tank and interposed between said abutments both of which it closely approaches to prevent material movement of the tank longitudinally of the underframe at said depending projection; means for holding the tank down to maintain said depending projection between said abutments; and side abutments with which the depending projection is also closely engaged to prevent material movement of the depending projection and the lower portion of the tank transversely of the under frame.

5. A tank car structure including wheel trucks at its ends; an underframe carrying abutments spaced apart longitudinally thereof and secured thereto; a projection depending from the tank and interposed between said abutments both of which it closely approaches to prevent material movement of the tank longitudinally of the underframe at said depending projection; and tank bands secured at their ends to the underframe and serving to hold the tank down to maintain said depending projection between said abutments.

6. A tank car structure including wheel trucks at its ends; an underframe carrying abutments spaced apart longitudinally thereof and secured thereto; a projection depending from the tank and interposed between said abutments both of which it closely approaches to prevent material movement of the tank longitudinally of the underframe at said depending projection; and means for holding the tank down to maintain said depending projection between said abutments.

7. A tank car structure including wheel trucks at its ends; an underframe carrying abutments spaced apart longitudinally thereof and secured thereto; a projection depending from the tank and interposed between said abutments both of which it closely approaches to prevent material movement of the tank longitudinally of the underframe at said depending projection; tank bands secured at their ends to the underframe and serving to hold the tank down to maintain said depending projection between said abutments; side abutments with which the depending projection is also closely engaged to prevent material movement of the depending projection and the lower portion of the tank transversely of the underframe, some of said abutments projecting upwardly from the underframe to constitute a seat structure for holding the tank above the underframe; and a saddle upon the underframe engaging another portion of the tank structure and upon which saddle the part of the tank structure engaged thereby is movable longitudinally of the car structure.

8. A tank car structure including wheel trucks at its ends; an underframe carrying abutments spaced apart longitudinally thereof and secured thereto; a projection depending from the tank and interposed between said abutments both of which it closely approaches to prevent material movement of the tank longitudinally of the underframe at said depending projection; means for holding the tank down to maintain said depending projection between said abutments; side abutments with which the depending projection is also closely engaged to prevent material movement of the depending projection and the lower portion of the tank transversely of the underframe, some of said abutments projecting upwardly from the underframe to constitute a seat structure for holding the tank above the underframe; and a saddle upon the underframe engaging another portion of the tank structure and upon which saddle the part of the tank structure engaged thereby is movable longitudinally of the car structure.

9. A tank car structure including wheel trucks at its ends; an underframe carrying abutments spaced apart longitudinally thereof and secured thereto; a projection depending from the tank and interposed between said abutments both of which it closely approaches to prevent material movement of the tank longitudinally of the underframe at said depending projection; tank bands secured at their ends to the underframe and serving to hold the tank down to maintain said depending projection between said abutments; side abutments with which the depending projection is also closely engaged to prevent material movement of the depending projection and the lower portion of the tank transversely of the underframe; and a saddle upon the underframe engaging another portion of the tank structure and upon which saddle the part of the tank structure engaged thereby is movable longitudinally of the car structure.

10. A tank car structure including wheel trucks at its ends; an underframe carrying abutments spaced apart longitudinally thereof and secured thereto; a projection depending from the tank and interposed between said abutments both of which it closely approaches to prevent material movement of the tank longitudinally of the underframe at said depending projection; means for holding the tank down to maintain said depending projection between said abutments; side abutments with which the depending projection is also closely engaged to prevent material movement of the depending projection and the lower portion of the tank transversely of the underframe; and a saddle upon the underframe engaging another portion of the tank structure and upon which saddle the part of the tank structure engaged thereby is movable longitudinally of the car structure.

11. A tank car structure including wheeel trucks at its ends; an underframe carrying abutments spaced apart longitudinally thereof and secured thereto; a projection depending from the tank and interposed between said abutments both of which it closely approaches to prevent material movement of the tank longitudinally of the underframe at said depending projection; tank bands secured at their ends to the underframe and serving to hold the tank down to maintain said depending projection between said abutments; and a saddle upon the underframe engaging another portion of the tank structure and upon which saddle the part of the tank structure engaged thereby is movable longitudinally of the car structure.

12. A tank car structure including wheel trucks at its ends; an underframe carrying abutments spaced apart longitudinally thereof and secured thereto; a projection depending from the tank and interposed between said abutments both of which it closely approaches to prevent material movement of the tank longitudinally of the underframe at said depending projection; means for holding the tank down to maintain said depending projection between said abutments; and a saddle upon the underframe engaging another portion of the tank structure and upon which saddle the part of the tank structure engaged thereby is movable longitudinally of the car structure.

In witness whereof I hereunto subscribe my name this twenty seventh day of October, A. D. 1917.

CHARLES A. SHOEMAKER.

Copies of this patent may be obtained for five cents each, by addressing the "Commissioner of Patents, Washington, D. C."